United States Patent
Lim et al.

(10) Patent No.: US 10,808,902 B1
(45) Date of Patent: Oct. 20, 2020

(54) SLIM TYPE LAMP APPARATUS FOR VEHICLE

(71) Applicants: HYUNDAI MOTOR COMPANY, Seoul (KR); KIA MOTORS CORPORATION, Seoul (KR)

(72) Inventors: Jung Wook Lim, Seoul (KR); Seung Hyeok Chang, Suwon-si (KR); Ki Hong Lee, Seoul (KR); Byoung Suk Ahn, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/583,475

(22) Filed: Sep. 26, 2019

(30) Foreign Application Priority Data

Jun. 13, 2019 (KR) .......................... 10-2019-0070118

(51) Int. Cl.
| | | |
|---|---|---|
| *F21S 41/33* | (2018.01) | |
| *F21S 41/365* | (2018.01) | |
| *F21S 41/20* | (2018.01) | |
| *B60Q 1/00* | (2006.01) | |
| *F21S 41/24* | (2018.01) | |
| *F21S 41/40* | (2018.01) | |

(52) U.S. Cl.
CPC .......... *F21S 41/365* (2018.01); *B60Q 1/0041* (2013.01); *F21S 41/24* (2018.01); *F21S 41/285* (2018.01); *F21S 41/33* (2018.01); *F21S 41/40* (2018.01)

(58) Field of Classification Search
CPC .......... F21S 41/365; F21S 41/33; F21S 41/40; F21S 41/285; F21S 41/24; B60Q 1/0041
See application file for complete search history.

(56) References Cited

U.S. PATENT DOCUMENTS

| | | | | |
|---|---|---|---|---|
| 9,400,089 | B2* | 7/2016 | Nakaya | F21S 41/148 |
| 10,288,248 | B1* | 5/2019 | Crespin | F21S 41/148 |
| 10,605,428 | B2* | 3/2020 | Ecker-Endl | F21S 41/285 |
| 2008/0273338 | A1* | 11/2008 | Stefanov | G02B 6/0001 |
| | | | | 362/310 |
| 2008/0285295 | A1* | 11/2008 | Schug | F21S 41/24 |
| | | | | 362/487 |
| 2011/0085333 | A1* | 4/2011 | Ohno | F21S 41/155 |
| | | | | 362/244 |
| 2011/0085343 | A1* | 4/2011 | Ohno | F21S 41/143 |
| | | | | 362/510 |
| 2014/0022804 | A1* | 1/2014 | Konishi | F21S 41/43 |
| | | | | 362/487 |
| 2014/0036526 | A1* | 2/2014 | Sato | F21S 41/143 |
| | | | | 362/518 |
| 2016/0230949 | A1* | 8/2016 | de Lamberterie | F21S 41/285 |
| 2017/0184267 | A1* | 6/2017 | Courcier | F21S 41/143 |
| 2020/0041089 | A1* | 2/2020 | Gromfeld | F21S 41/322 |

FOREIGN PATENT DOCUMENTS

KR 10-2013-0048540 A 5/2013

\* cited by examiner

*Primary Examiner* — Donald L Raleigh
(74) *Attorney, Agent, or Firm* — Brinks Gilson & Lione (57) ABSTRACT

A degree of freedom of upper and lower widths of an area in which light is emitted is secured such that a slim type head lamp is implemented. Further, a slim type lamp apparatus for a vehicle, in which a low beam and a high beam are implemented at the same lighting portion, and an overall size of an optical system is reduced such that it is advantageous to configure a package of an optical system, is disclosed.

15 Claims, 8 Drawing Sheets

SLIM TYPE LAMP APPARATUS FOR VEHICLE

CROSS REFERENCE TO RELATED APPLICATION

This application claims priority to and the benefit of Korean Patent Application No. 10-2019-0070118, filed on Jun. 13, 2019, the entire contents of which are incorporated herein by reference.

FIELD

The present disclosure relates to a slim type lamp apparatus for a vehicle, which is capable of realizing a low beam and a high beam.

BACKGROUND

The statements in this section merely provide background information related to the present disclosure and may not constitute prior art.

Generally, a vehicle is provided with a lighting apparatus to emit light on an object in a driving direction to be seen well while the vehicle is driving at night and to inform another vehicle or road user of a driving state of the vehicle. A vehicle has a headlight (also known as a headlamp) which is a lighting lamp to illuminate a path ahead of the vehicle.

A vehicle may further include other lamps such as fog lights, turn signals, brake lights, and back up lamps. Light irradiation directions of light of the lamps are differently set with respect to a road surface. In a normal driving situation, a low beam is irradiated through the headlamps, and a high beam is irradiated in a specific situation.

We have discovered that downsizing an optical system for a future vehicle is challenging because it is difficult to reduce a size of an optical system capable of emitting both a low beam and a high beam.

The foregoing is intended merely to aid in the understanding of the background of the present disclosure, and is not intended to mean that the present disclosure falls within the purview of the related art that is already known to those skilled in the art.

SUMMARY

The present disclosure proposes a lamp apparatus for a vehicle, which is capable of realizing both a low beam and a high beam and reducing an overall size of an optical system such that it is advantageous in configuring a package of the optical system.

According to one aspect of the present disclosure, a lamp apparatus for a vehicle includes: a first lighting instrument configured to emit a low light beam; and a reflector including an incident part on which the low light beam emitted from the first lighting instrument is incident, and an exit part from which the incident low light beam exits, wherein the reflector is formed in a bent shape such that the incident part and the exit part of the reflector are disposed at different positions, and a first reflective surface with a first reflection angle, wherein the first reflective surface is configured to reflect the low light beam, which is received at the reflector through the incident part, such that the low light beam travels toward the exit part.

The first lighting instrument for the low light beam may include a first light source configured to emit the low light beam, and a parallel light lens configured to convert the low light beam, which is emitted from the first light source, into parallel light.

The first reflection angle of the first reflective surface may be equal to or greater than a critical angle with respect to a traveling direction of the low light beam.

The lamp apparatus may further include a second lighting instrument configured to emit a high light beam, wherein the second lighting instrument may irradiate light onto the exit part of the reflector and may be disposed to have an irradiation angle of the light that is smaller than a reflection angle of a second reflective surface such that the light for the high light beam may pass through the second reflective surface.

The second lighting instrument for the high light beam may include a second light source configured to emit the light for the high light beam, and a condensing lens part configured to condense the light for the high light beam emitted from the second light source.

The reflector may be formed with a plurality of beam guides connected to each other forming the bent shape, the second reflective surface is formed at another bent portion of the reflector, the incident part and the exit part are formed at both ends of the reflector, the first lighting instrument for the low light beam may be disposed near the incident part, and the second lighting instrument for the high light beam may be disposed onto the second reflective surface.

The reflector may include: a connection guide formed to extend in a straight line and having a light passing space therein; a first beam guide having both ends at which the incident part and a first bent part are formed, connected to communicate with the connection guide through the first bent part, disposed to extend in a direction different from a direction of the connection guide, and having the first reflective surface with the first reflection angle; and a second beam guide having both ends at which a second bent part and the exit part are formed, connected to communicate with the connection guide through the second bent part, disposed to extend in a direction different from the direction of the connection guide, and having the second reflective surface with a second reflection angle.

The second reflection angles of the second reflective surface may be equal to or greater than a critical angle such that the light for the low light beam, which is incident through the incident part, may be reflected on the first reflective surface and the second reflective surface to travel toward the exit part.

A portion of the first reflective surface of the first beam guide may be recessed to form a cut-off shaped part configured to form a cut-off line.

The lighting instrument for a high beam may be disposed to irradiate the light for a high beam onto a second reflective surface such that some of the light for a high beam is reflected inside the second beam guide to be emitted through the exit part, and the remaining light for a high beam is not reflected inside the second beam guide to be emitted through the exit part.

The reflector may further include a light blocking shield configured to block light emitted from the connection guide and the first beam guide such that only light through the second beam guide may be allowed to be emitted.

The reflector may include a low beam guide foiled to extend in a straight line and having the incident part formed therein; an integrated guide formed to extend in a direction different from that of the low beam guide and having the exit part formed therein; and a reflective guide configured to connect the low beam guide to the integrated guide and having the first reflective surface with the first reflection angle so as to reflect the light for the low light beam, which is incident through the incident part, toward the exit part.

A cut-off shield configured to form a cut-off line may be provided between the first lighting instrument for the low light beam and the incident part of the low beam guide, or in the incident part.

The reflector may commonly use a single incident part and branch out from the incident part into a plurality of parts to extend to different positions such that the reflector may be formed to have a plurality of exit parts at different positions and a plurality of reflective surfaces may be formed at corresponding bent portions. The first lighting instrument for the low light beam may be disposed near the incident part, and a plurality of second lighting instruments for the high light beam may be respectively provided onto the corresponding reflective surfaces.

The plurality of second lighting instruments for the high light beam may be configured to irradiate different colors of light for the high light beam, and the reflector may further include a complementary color shield configured to convert a color of light which is emitted to an area except for the exit parts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a slim type lamp apparatus for a vehicle according to exemplary forms of the present disclosure will be described with reference to the accompanying drawings.

Figure 1:
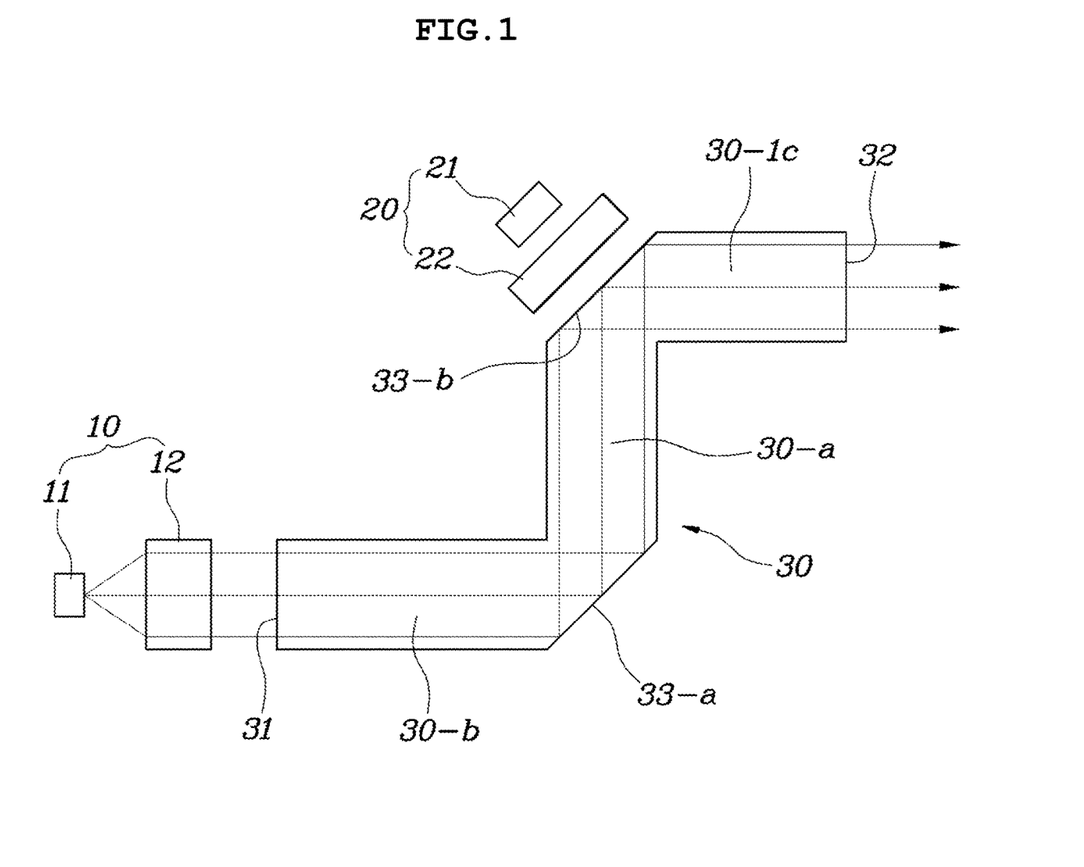
FIG. 1 is a diagram illustrating a slim type lamp apparatus for a vehicle in one form of the present invention.
Figure 2:
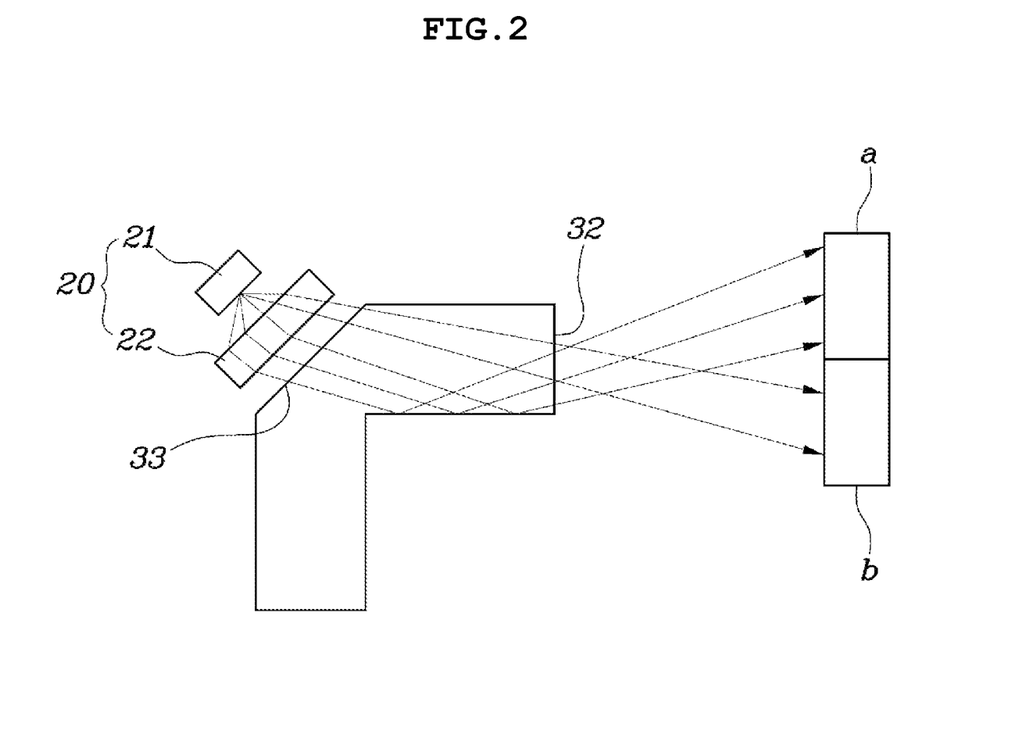
FIG. 2 is a diagram for describing the slim type lamp apparatus for a vehicle shown in FIG. 1.
Figure 3:
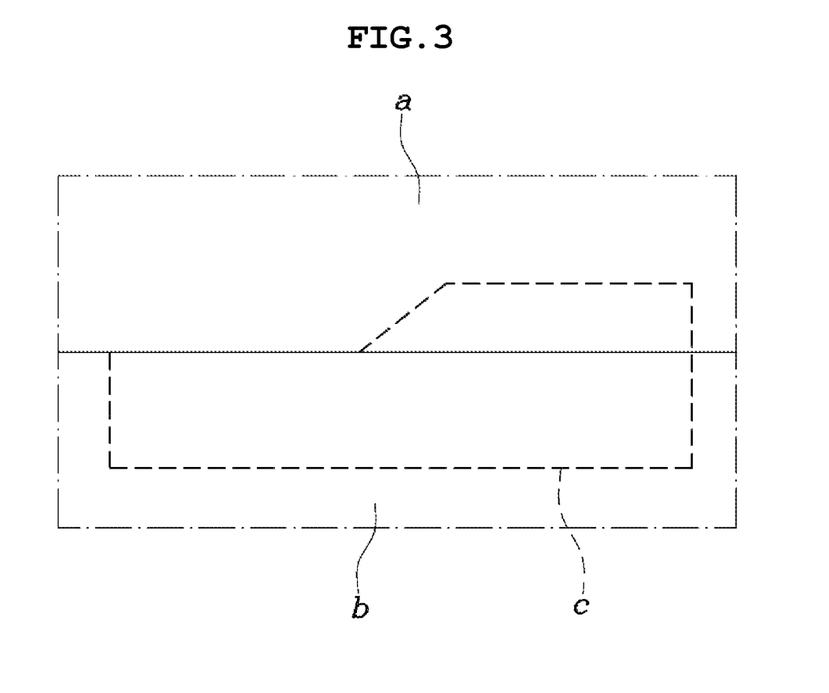
FIG. 3 illustrates irradiation areas formed by light beams in one form of the present disclosure.
Figure 4:
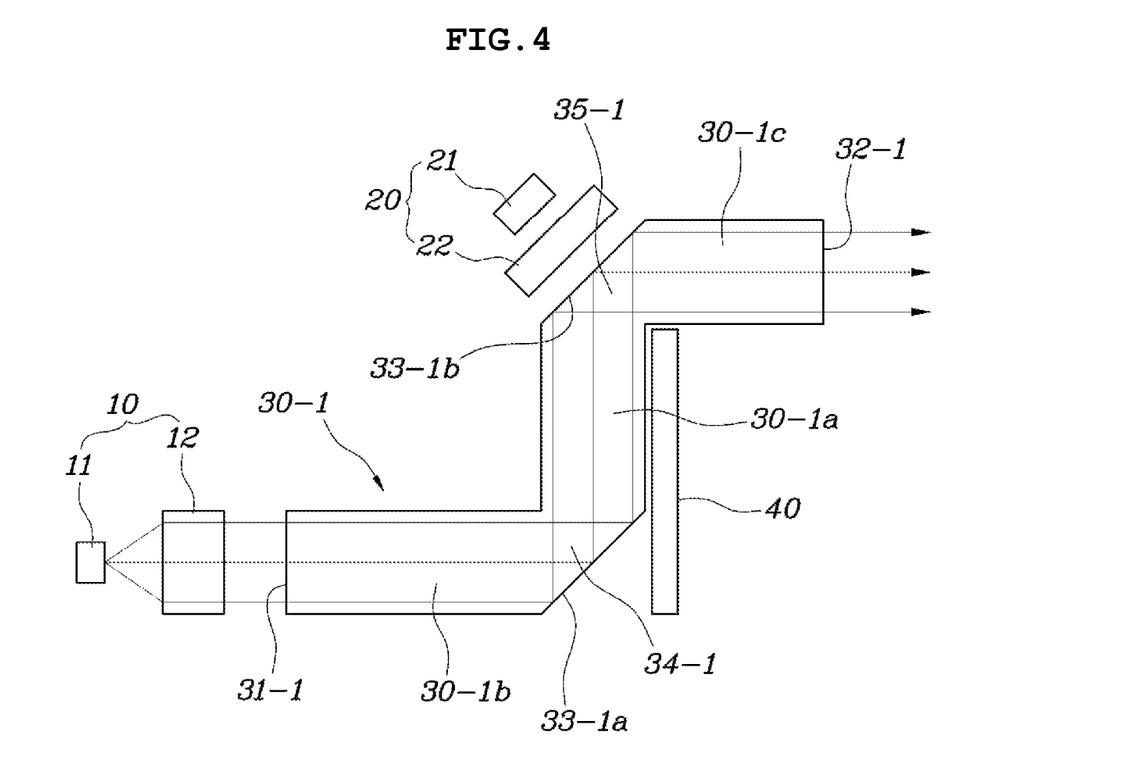
FIG. 4 is a diagram illustrating a slim type lamp apparatus for a vehicle in a first form of the present disclosure.
Figure 5:
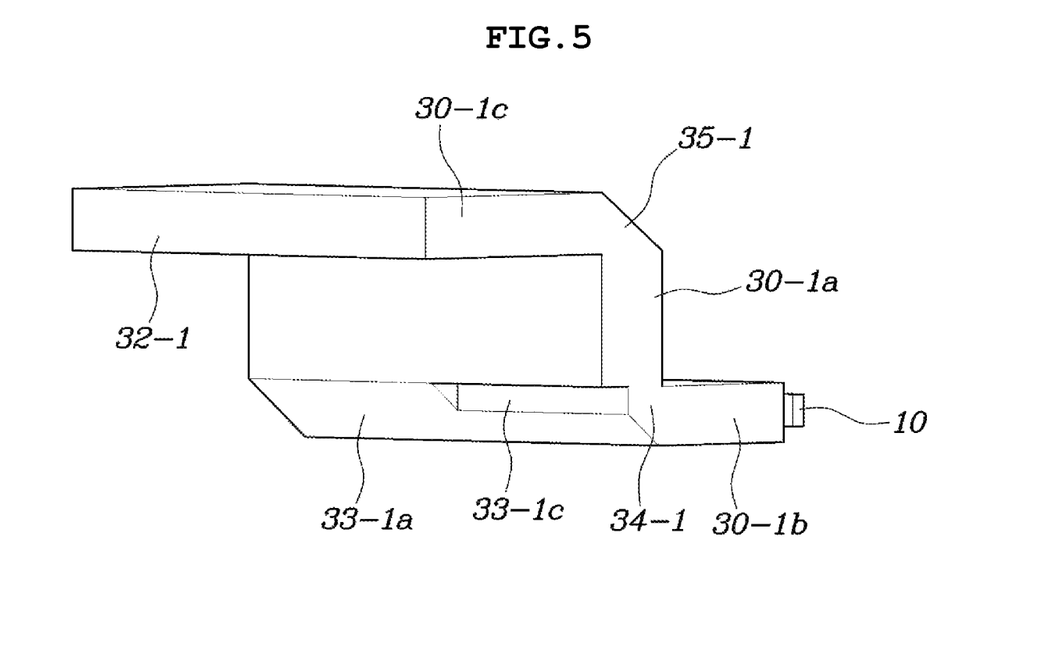
FIG. 5 is a diagram for describing the slim type lamp apparatus for a vehicle in the first form shown in FIG. 4.
Figure 6:
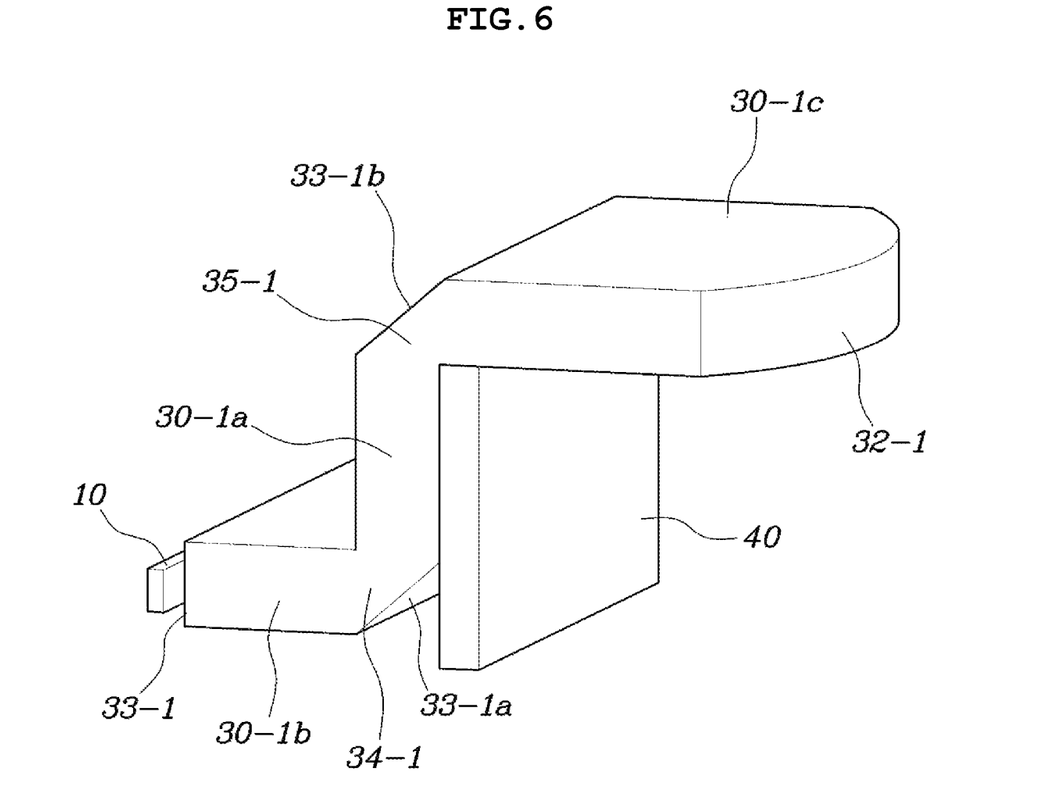
FIG. 6 illustrates the slim type lamp having a light blocking shield in another form of the lamp apparatus in FIG. 4.
Figure 7:
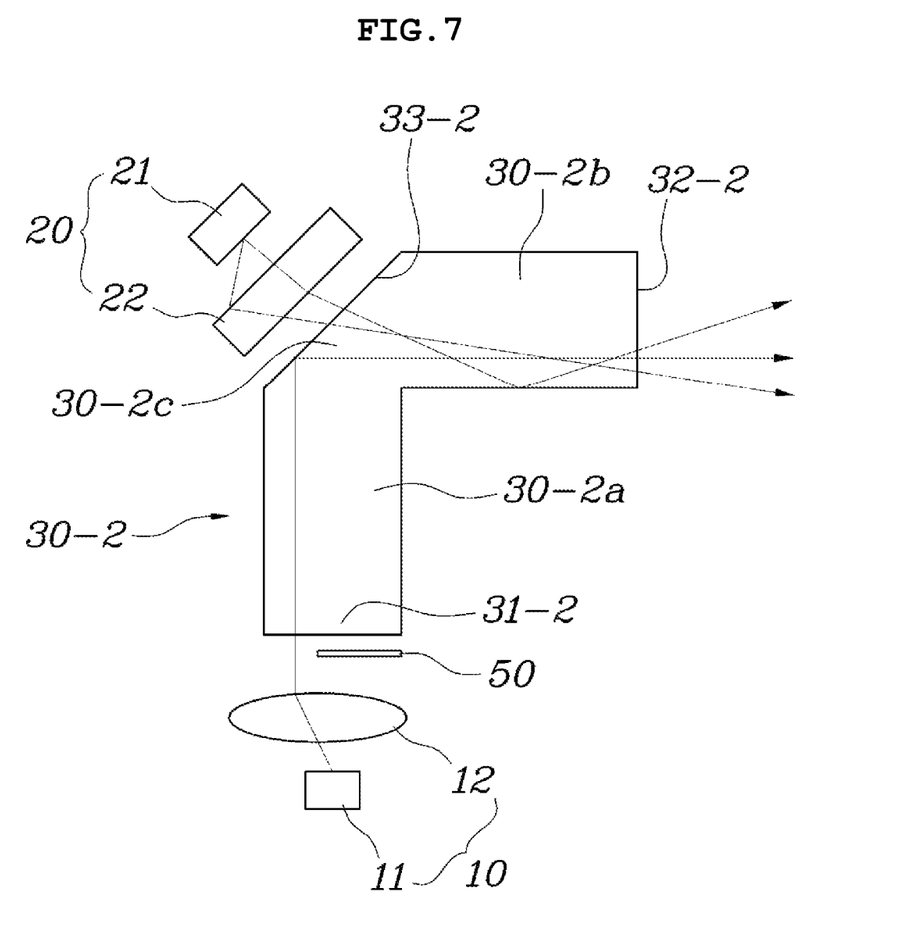
FIG. 7 is a diagram illustrating a slim type lamp apparatus for a vehicle in a second form of the present disclosure.
Figure 8:
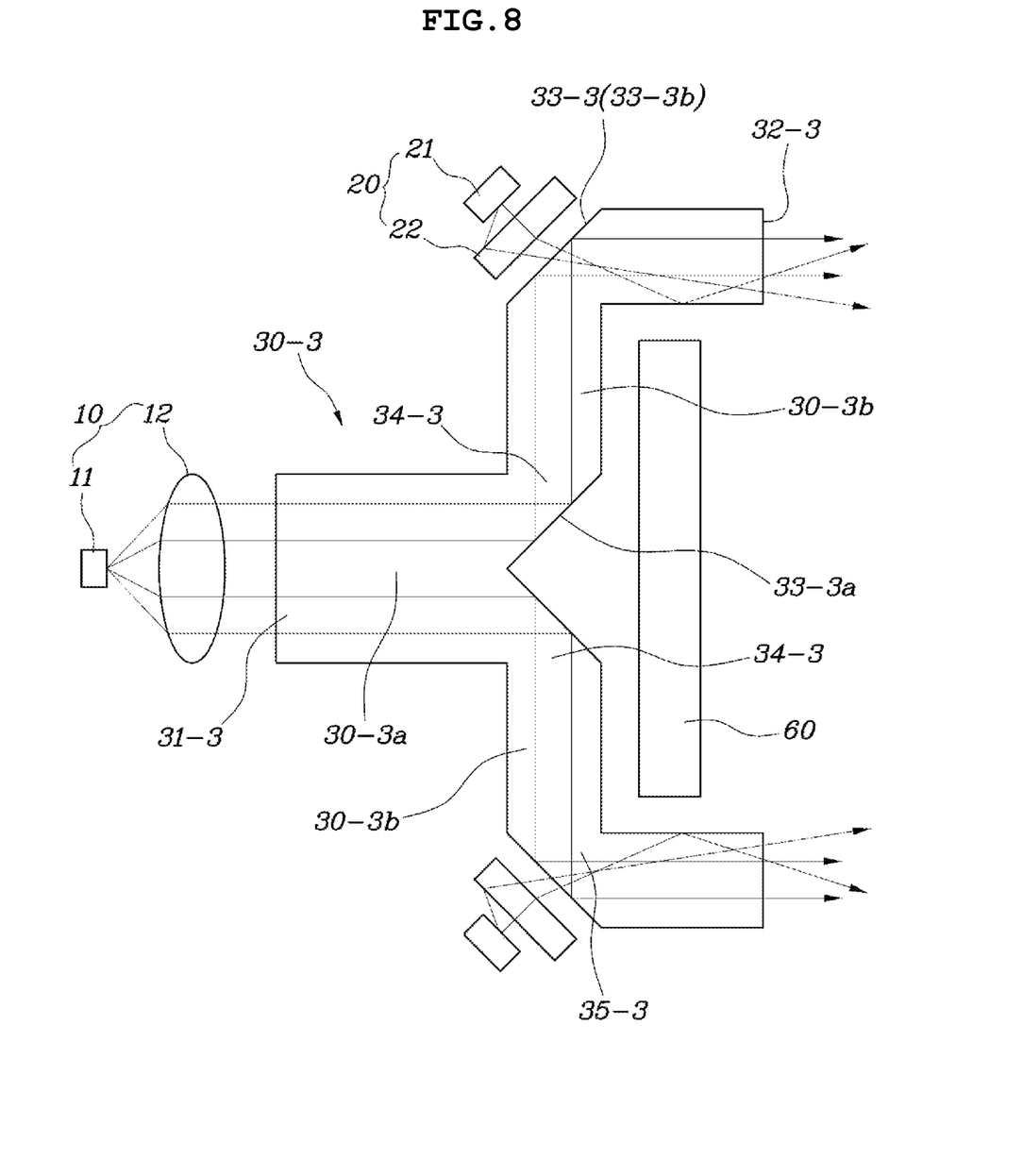
FIG. 8 is a diagram illustrating a slim type lamp apparatus for a vehicle in a third form of the present disclosure.

FIG. 1 is a diagram illustrating a slim type lamp apparatus for a vehicle according to the present disclosure, and FIGS. 2 to 3 are diagrams for describing the slim type lamp apparatus for a vehicle shown in FIG. 1. Further, FIG. 4 is a diagram illustrating a slim type lamp apparatus for a vehicle according to a first form of the present disclosure, FIGS. 5 to 6 are diagrams for describing the slim type lamp apparatus for a vehicle according to the first form shown in FIG. 4, FIG. 7 is a diagram illustrating a slim type lamp apparatus for a vehicle according to a second form of the present disclosure, and FIG. 8 is a diagram illustrating a slim type lamp apparatus for a vehicle according to a third form of the present disclosure.

As shown in FIG. 1, the slim type lamp apparatus for a vehicle includes a lighting instrument 10 for a low beam configured to illuminate light for a low beam, and a reflector 30 having an incident part 31 into which light irradiated from the lighting instrument 10 for a low beam is incident and an exit part 32 from which the incident light is emitted, wherein the reflector 30 is formed in a bent shape such that the incident part 31 and the exit part 32 are located at different positions, and having a reflective surface 33-*a* which is formed at a bent portion to have a reflection angle and configured to allow light for a low beam incident through the incident part 31 to travel toward the exit part 32 by being reflected on the reflective surface 33-*b*.

That is, light for a low beam, which is irradiated from the lighting instrument 10 for a low beam, passes through the reflector 30 to be emitted to the outside. Here, the reflector 30 may be made of a glass material and formed in a bent shape such that the incident part 31 and the exit part 32 are disposed at different positions. As shown in FIG. 1, the light for a low beam is incident on the incident part 31 of the reflector 30 and reflected on a reflective surface 33-*a*, 33-*b* formed on the bent portion of the reflector 30 to propagate to be emitted through the exit part 32. Thus, the reflector 30 has a high degree of freedom in setting upper and lower widths of a portion at which the exit part 32 is formed such that a slim type head lamp may be configured.

To this end, the lighting instrument 10 for a low beam may include a light source 11 for a low beam configured to irradiate light for a low beam, and a parallel light lens 12 configured to convert the light for a low beam irradiated from the light source 11 for a low beam into parallel light.

Here, the light source 11 for a low beam may be comprised of a light emitting diode (LED). When light for a low beam, which is irradiated from the light source 11 for a low beam, penetrates through the parallel light lens 12, the light is converted into parallel light to be incident on the incident part 31 of the reflector 30. Thus, the light irradiated from the light source 11 for a low beam is converted into the parallel light such that, when the parallel light is reflected on the reflective surface 33-*a*, 33-*b*, the parallel light may travel as being intended according to a reflection angle of the reflective surface 33-*a*, 33-*b* by being reflected on the reflective surface 33-*a*, 33-*b*.

Here, the reflection angle of the reflective surface 33-*a*, 33-*b* may be set to an angle that is equal to or greater than a critical angle with respect to a traveling direction of the light for a low beam. The reflection angle of the reflective surface 33-*a*, 33-*b* is set on the basis of Snell's law. The reflection angle of the reflective surface 33-*a*, 33-*b* may be set in a condition in which light is totally reflected in consideration of an incident angle of the light for a low beam which is converted into the parallel light.

For example, assuming that a refractive index of a medium 1 is one and a refractive index of a medium 2 is 1.5 because the reflector 30 is made of a glass, $$\sin\theta_c = \frac{n_1}{n_2} = \frac{1}{1.5} = 0.67$$

and $\theta_c = 42°$ and may be derived on the basis of Snell's law. Thus, a critical angle becomes 42°, and, when the light for a low beam is incident on the reflective surface 33-a, 33-b at an angle that is greater than 42°, total reflection may be achieved.

Consequently, the reflection angle of the reflective surfaces 33-a, 33-b is set to the condition in which the light is totally reflected such that the light incident on the incident part 31 of the reflector 30 may travel toward the exit part 32.

Meanwhile, as shown in FIGS. 1 to 2, a lighting instrument 20 for a high beam is further included to irradiate light for a high beam. The lighting instrument 20 for a high beam is disposed to irradiate light toward a reflective surface 33-b at the exit part 32 side of the reflector 30 and disposed to allow an irradiation angle of the light for a high beam to be smaller than a reflection angle thereof such that the light for a high beam may pass through the reflective surface 33.

That is, the lighting instrument 20 for a high beam irradiates the light on the reflective surface 33 of the reflector 30 and is disposed to allow the irradiation angle of the light for a high beam to be smaller than the reflection angle thereof. Consequently, the light for a high beam which is irradiated from the lighting instrument 20 for a high beam may pass through the reflective surface 33 to travel toward the exit part 32 of the reflector 30. The above description is on the basis of Snell's law. The lighting instrument 20 for a high beam is configured such that the irradiation angle of the light for a high beam is smaller than the reflection angle that is a critical angle. Consequently, the light for a high beam may pass through the reflective surface 33 to be incident into the reflector 30 and then may be emitted through the exit part 32.

To this end, the lighting instrument 20 for a high beam may include a light source 21 for a high beam configured to irradiate light for a high beam and a condensing lens part 22 configured to condense the light for a high beam which is irradiated from the light source 21 for a high beam.

Here, the light source 21 for a high beam may be comprised of an LED. The light for a high beam irradiated from the light source 21 for a high beam may be condensed onto the reflective surface 33 of the reflector 30 through the condensing lens part 22 to be incident into the reflector 30. Consequently, light efficiency of the light source 21 for a high beam is improved such that, when a high beam is irradiated, light efficiency may be secured.

The lighting instrument 20 for a high beam is disposed to irradiate the light for a high beam onto the reflective surface 33. Some of the light for a high beam may be reflected inside the reflector 30 to be emitted through the exit part 32, and the remaining light for a high beam may not be reflected inside the reflector 30 to be emitted through the exit part 32. Thus, the light for a high beam which is emitted through the exit part 32 of the reflector 30 may be irradiated with a wide irradiation area in comparison with the light for a low beam. That is, as shown in FIG. 2, the light for the high beam emitted from the lighting instrument 20 for a high beam passes through the reflective surface 33 of the reflector 30 and travels into the reflector 30. Some of the light for the high beam is reflected inside the reflector 30 to travel upward, thereby forming a first irradiation area a, and the remaining light for a high beam is directly emitted through the exit part 32 to form a second irradiation area b.

Accordingly, as shown in FIG. 3, when both of the lighting instrument 10 for a low beam and the lighting instrument 20 for a high beam irradiate the light for a low beam and a high beam, the first irradiation area a and the second irradiation area b are formed due to the light for a high beam and both of the light for a low beam and the light for a high beam are emitted from the same exit part 32 such that a low beam irradiation area c is in the form of being irradiated in the irradiation areas a and b due to the light for a high beam.

Meanwhile, the reflector 30 may be configured such that a plurality of beam guides 30-a, 30-b, 30-c are connected to each other and famed to extend in a bent form, the reflective surface 33 is formed at a bent portion, and the incident part 31 and the exit part 32 are formed at both ends of the reflector 30. Here, the lighting instrument 10 for a low beam may be disposed to irradiate the light for a low beam to the incident part 31, and the lighting instrument 20 for a high beam may be disposed to irradiate the light for a high beam to the reflective surface 33 of the exit part 32 side. That is, the reflector 30 may have a form in which the plurality of beam guides are bent to extend to be applied to various forms. The incident part 31 and the exit part 32 are famed at different positions and thus a degree of freedom of setting upper and lower widths at a portion in which the exit part 32 is formed increases such that a slim type head lamp may be implemented. Further, the light for a low beam is incident on the incident part 31 and the light for a high beam is incident through the reflective surface 33-b of the exit part 32 side at the bent portion such that a low beam is distinguished from a high beam, and both of the low beam and the high beam are emitted through the single exit part 32.

Various forms of the reflector 30 will be described below.

As shown in FIG. 4, a reflector 30-1 according to a first form of the present disclosure may include a connection guide 30-1a formed to extend in a straight line and having a light passing space therein; a first beam guide 30-1b having both ends at which an incident part 31-1 and a first bent part 34-1 are formed, connected to communicate with the connection guide 30-1a through the first bent part 34-1, disposed to extend in a direction different from that of the connection guide 30-1a, and having a first reflective surface 33-1a formed to have a reflection angle at the first bent part 34-1; and a second beam guide 30-1c having both ends at which a second bent part 35-1 and an exit part 32-1 are formed, connected to communicate with the connection guide 30-1a through the second bent part 35-1, disposed to extend in a direction different from that of the connection guide 30-1a, and having a second reflective surface 33-1b formed to have a reflection angle at the second bent part 35-1.

As described above, the reflector 30-1 may be configured such that the connection guide 30-1a, the first beam guide 30-1b, and the second beam guide 30-1c are integrally connected. The reflector 30-1 may be formed in a shape, as shown in FIG. 4, in which the first beam guide 30-1b at which the incident part 31-1 is formed and the second beam guide 30-1c in which the exit part 32-1 is formed extend to the both ends of the connection guide 30-1a.

Here, each of the connection guide 30-1a, the first beam guide 30-1b, and the second beam guide 30-1c has a light passing space therein such that light incident into the light passing space may travel and each of the connection guide 30-1a, the first beam guide 30-1b, and the second beam guide 30-1c extends in a straight line to allow the light to travel along a predetermined path.

As shown in FIG. 4, the reflector 30-1 according to the first form has a shape in which the first beam guide 30-1b and the second beam guide 30-1c are connected in a horizontal direction to the both ends of the connection guide 30-1a extending in a vertical direction.

Here, the incident part 31-1 on which light for a low beam, which is irradiated from a lighting instrument 10 for a low beam, is incident and the first bent part 34-1 which is connected to the connection guide 30-1a are formed at the first beam guide 30-1b, and the first reflective surface 33-1a is formed at the first bent part 34-1. Consequently, the light for a low beam which is incident through the incident part 31-1 may be totally reflected on the first reflective surface 33-1a to travel toward the connection guide 30-1a. Meanwhile, the second bent part 35-1 which is connected to the connection guide 30-1a and the exit part 32-1 from which light is emitted are formed at the second beam guide 30-1c, and a second reflective surface 33-1b is formed at the second bent part 35-1. Consequently, the light traveling from the first beam guide 30-1b to the connection guide 30-1a may be totally reflected on the second reflective surface 33-1b to travel toward the exit part 32-1.

A reflection angle of each of the first reflective surface 33-1a and the second reflective surface 33-1b is formed to have an angle that is equal to or greater than a critical angle such that light for a low beam which is incident through the incident part 31-1 may be set to be reflected on the first reflective surface 33-1a and the second reflective surface 33-1b to travel toward the exit part 32-1. Here, the critical angle may be varied and set according to a material of the reflector 30-1 and a traveling direction of the light for a low beam.

Meanwhile, a lighting instrument 20 for a high beam is disposed to irradiate light for a high beam onto the second reflective surface 33-1b. Some of the light for a high beam may be reflected on the second beam guide 30-1c to be emitted through the exit part 32, and the remaining light for a high beam may not be reflected on the second beam guide 30-1c to be emitted through the exit part 32.

Accordingly, the light for a high beam which is irradiated from the lighting instrument 20 for a high beam passes through the second reflective surface 33-1b to travel into the second beam guide 30-1c, some of the light for a high beam is reflected inside the second beam guide 30-1c and travels upward to form an irradiation area, and the remaining of the light for a high beam is directly emitted through the exit part 32-1 without being reflected inside the second beam guide 30-1c to form another irradiation area.

As described above, the reflector 30-1 according to the first form has the single common exit part 32-1 and allows the light irradiated from the lighting instrument 10 for a low beam and the lighting instrument 20 for a high beam, which are provided at different positions, to be totally reflected in the reflector 30-1 or to pass therethrough, thereby emitting the light through the single common exit part 32-1. Consequently, it is possible to implement both of the low beam and the high beam in the single reflector 30-1.

Meanwhile, as shown in FIG. 5, a cut-off shaped part 33-1c of which portion is recessed to from a cut-off line may be formed in the first reflective surface 33-1a of the first beam guide 30-1b. The cut-off shaped part 33-1c is provided to forming a cut-off line with respect to a low beam irradiation area. As the cut-off shaped part 33-1c is recessed in the first reflective surface 33-1a, the recessed portion is famed to have an angle that is smaller than a critical angle with respect to the light for a low beam such that the light for a low beam passes through the recessed portion without being totally reflected and thus a cut-off line is implemented.

Meanwhile, as shown in FIG. 6, the reflector 30-1 further includes a light blocking shield 40 for blocking the light irradiated from the connection guide 30-1a and the first beam guide 30-1b, thereby allowing the light to be emitted through only the second beam guide 30-1c. Consequently, when the light passing through the reflector 30-1 is emitted, the light is prevented from being emitted from a space other than the exit part 32-1, and the cut-off line is also clearly formed.

Meanwhile, as shown in FIG. 7, a reflector 30-2 according to a second form of the present disclosure may include a low beam guide 30-2a which is formed to extend in a straight line and at which an incident part 31-2 is formed; an integrated guide 30-2b which is formed to extend in a direction different from that of the low beam guide 30-2a and at which an exit part 32-2 is formed; and a reflective guide 30-2c which connects the low beam guide 30-2a to the integrated guide 30-2b and at which a reflective surface 33-2 is formed to have a reflection angle so as to allow light for a low beam, which is incident through the incident part 31-2, to be reflected to the exit part 32-2 and to travel thereto.

As described above, the reflector 30-2 according to the second form of the present disclosure may be configured such that the low beam guide 30-2a, the integrated guide 30-2b, and the reflective guide 30-2c are integrally connected. The low beam guide 30-2a and the integrated guide 30-2b are connected in a vertical direction through the reflective guide 30-2c such that the reflector 30-2 may be formed in a shape shown in FIG. 7.

Here, each of the low beam guide 30-2a, the integrated guide 30-2b, and the reflective guide 30-2c has a light passing space therein. The low beam guide 30-2a and the integrated guide 30-2b may extend in a straight line, and the reflective guide 30-2c may be formed to have an inclination, thereby allowing light to travel.

In particular, the reflective surface 33-2 is formed at the reflective guide 30-2c such that the light for a low beam, which is incident through the incident part 31-2 of the low beam guide 30-2a, may be totally reflected on the reflective surface 33-2 of the reflective guide 30-2c to travel to the integrated guide 30-2b. Here, a reflection angle of the reflective surface 33-2 is formed to have an angle that is equal to or greater than a critical angle such that the light for a low beam, which is incident through the incident part 31-2, may be totally reflected to travel to the exit part 32-2.

Meanwhile, a lighting instrument 20 for a high beam is disposed to irradiate light for a high beam onto the reflective surface 33-2 of the reflective guide 30-2c. Some of the light for a high beam may be reflected inside the integrated guide 30-2b to be emitted through the exit part 32-2, and the remaining light for a high beam may be directly emitted through the exit part 32-2.

Accordingly, the light for a high beam which is irradiated from the lighting instrument 20 for a high beam passes through the reflective surface 33-2 of the reflective guide 30-2c to travel into the integrated guide 30-2b, some of the light for a high beam is reflected inside the integrated guide 30-2b and travels upward to form an irradiation area, and the remaining of the light for a high beam is directly emitted through the exit part 32-2 without being reflected inside the integrated guide 30-2b to form another irradiation area.

As described above, the reflector 30-2 according to the second form has the single common exit part 32-2 and allows the light irradiated from the lighting instrument 10 for a low beam and the lighting instrument 20 for a high beam, which are provided at different positions, to be totally reflected in the integrated guide 30-2b or to pass therethrough, thereby emitting the light through the exit part 32-2 of the integrated guide 30-2b. Consequently, it is possible to implement both of the low beam and the high beam in the single reflector 30-2.

Meanwhile, as shown in FIG. 7, a cut-off shield 50 for forming a cut-off line may be provided between the lighting instrument 10 for a low beam and the incident part 31-2 of the low beam guide 30-2a, or in the incident part 31-2.

Unlike the first form, in the second form, the light for a low beam travels through the low beam guide 30-2a extending in a straight line. In order to form a cut-off line, the cut-off shield 50 is provided between the lighting instrument 10 for a low beam and the incident part 31-2 of the low beam guide 30-2a, or in the incident part 31-2.

Consequently, a cut-off is formed in the light for a low beam, which is irradiated from the lighting instrument 10 for a low beam, along the cut-off line, and the light for a low beam, in which the cut off is famed, is emitted to the outside through the reflective guide 30-2c and the integrated guide 30-2b such that the cut-off line may be implemented with respect to an irradiation area.

Meanwhile, as shown in FIG. 8, a reflector 30-3 according to a third form of the present disclosure commonly uses a single incident part 31-3 and branches into a plurality of parts to extend to different positions in a bent shape such that the reflector 30-3 may be formed to have exit parts 32-3 at different positions and reflective portions 33-3 may be formed at bent portions. Here, a lighting instrument 10 for a low beam may be disposed to irradiate light for a low beam to an incident part 31-3, and a plurality of lighting instruments 20 for a high beam may be provided and disposed to irradiate light for a high beam to the reflective surfaces.

That is, the reflector 30-3 may include a common guide 30-3a formed to extend in a straight line, having both ends at which the incident part 31-3 and a reflective part 34-3 are formed, and having a third reflective surface 33-3a famed at the reflective part 34-3 to reflect the light for a low beam to a plurality of paths; and an exit guide 30-3b which branches into a plurality of parts along traveling paths of the light for a low beam which travels by being reflected on the reflective surface 33-3a in the common guide 30-3a, bent to extend through in bent parts 35-3 in different directions, having fourth reflective surfaces 33-3b famed at the bent parts 35-3, and having the exit parts 32-3 provided at extending final ends of the exit guide 30-3b.

As described above, the reflector 30-3 according to the third form may be configured to have a single incident part 31-3 and a plurality of exit parts 32-3 by integrally connecting the common guide 30-3a to the exit guides 30-3b, and the exit guides 30-3b may branch from the common guide 30-3a to extend such that the reflector 30-3 may be formed in a shape shown in FIG. 8.

Accordingly, the light for a low beam which is irradiated from the lighting instrument 10 for a low beam is incident on the single incident part 31-3 through the common guide 30-3a, reflected on the third reflective surface 33-3a, and branches into and travels to the exit guides 30-3b. As described above, the light for a low beam, which branches off on the fourth reflective surface 33-3b inside the exit guides 30-3b, is emitted through the exit parts 32-3 such that the light for a low beam may be irradiated onto the exit parts 32-3.

Here, a reflection angle of each of the third reflective surface 33-3a and the fourth reflective surface 33-3b is formed to have an angle that is equal to or greater than a critical angle such that the light for a low beam may be totally reflected to travel. Further, the third reflective surface 33-3a may be configured as a polyhedron so as to allow light to travel to the exit guides 30-3b.

Meanwhile, the plurality of lighting instruments 20 for a high beam may be disposed to irradiate light for a high beam onto the fourth reflective surfaces 33-3b which is formed on bent parts 35-3 of the exit guides 30-3b. As the exit guides 30-3b are provided, the plurality of lighting instruments 20 for a high beam are provided to be disposed at the fourth reflective surfaces 33-3b of the exit guides 30-3b.

As described above, the reflector 30-3 according to the third form has the single common incident part 31-3 and the exit parts 32-3 and may disperse the light for a low beam, which is emitted from the single lighting instrument 10 for a low beam being commonly used, to implement a low beam and may implement a high beam irradiated from the plurality of lighting instrument 20 for a high beam. Consequently, both of the low beam and the high beam may be implemented through the exit parts 32-3 of the exit guides 30-3b.

Meanwhile, the plurality of lighting instruments 20 for a high beam may be configured to irradiate different colors of light for a high beam, and the reflector 30-3 may further include a complementary color shield 60 for converting a color of light emitted to an area except for the exit parts 32-3.

As described above, the plurality of lighting instruments 20 for a high beam irradiate different colors of light such that colors of light emitted from the plurality of exit parts 32-3 may be different. Further, the complementary color shield 60 for converting the color of the light emitted to the area except for the exit parts 32-3 is further provided, and the light emitted from the reflector 30-3 may implement a background of a specific color by passing through the complementary color shield 60 and the color of the light emitted from the exit parts 32-3 is added such that light of various colors may be irradiated.

A light irradiation area may be diversified by stacking the described-above slim type lamp apparatus for a vehicle according to the present disclosure in multiple stages. Therefore, a degree of freedom of upper and lower widths of an area in which light is emitted is secured such that a slim type headlamp may be implemented, the low beam and the high beam are implemented at the same lighting portion, and an overall size of an optical system is reduced. Consequently, it is advantageous to configure a package of the optical system.

In accordance with a slim type lamp apparatus for a vehicle having the above-described structure, a degree of freedom of upper and lower widths of an area in which light is emitted is secured such that a slim type headlamp can be implemented. Further, in accordance with the slim type lamp apparatus for a vehicle, a low beam and a high beam are implemented at the same lighting portion, and an overall size of an optical system is reduced such that it is advantageous to configure a package of the optical system.

Although exemplary forms of the present disclosure has been described for illustrative purposes, those skilled in the art will appreciate that various modifications, additions and substitutions are possible, without departing from the scope and spirit of the present disclosure.

What is claimed is:

1. A lamp apparatus for a vehicle, the lamp comprising:
a first lighting instrument configured to emit a low light beam;
a reflector including:
an incident part on which the low light beam emitted from the first lighting instrument is incident,
an exit part from which the incident low light beam exits, wherein the reflector is formed in a bent shape such that the incident part and the exit part of the reflector are disposed at different positions, and
a first reflective surface with a first reflection angle, wherein the first reflective surface is configured to reflect the low light beam, which is received at the reflector through the incident part, such that the low light beam travels toward the exit part; and
a second lighting instrument configured to emit a high light beam,
wherein the second lighting instrument is configured to irradiate light onto the exit part of the reflector and is disposed to have an irradiation angle of the light that is smaller than a reflection angle of a second reflective surface such that the light for the high light beam passes through the second reflective surface.

2. The lamp apparatus of claim 1, wherein the first lighting instrument includes:
a first light source configured to emit the low light beam, and
a parallel light lens configured to convert the low light beam, which is emitted from the first light source, into parallel light.

3. The lamp apparatus of claim 1, wherein the first reflection angle of the first reflective surface is equal to or greater than a critical angle with respect to a traveling direction of the low light beam.

4. The lamp apparatus of claim 1, wherein the second lighting instrument includes:
a second light source configured to emit the light for the high light beam, and
a condensing lens part configured to condense the light for the high light beam emitted from the second light source.

5. The lamp apparatus of claim 1, wherein the second lighting instrument is configured to emit the light for the high light beam onto the second reflective surface such that some of the light for the high light beam is reflected inside the reflector to be emitted through the exit part, and the remaining light for the high light beam is not reflected inside the reflector.

6. The lamp apparatus of claim 1, wherein:
the reflector is formed with a plurality of beam guides connected to each other forming the bent shape, the second reflective surface is formed at another bent portion of the reflector, and the incident part and the exit part are formed at both ends of the reflector;
the first lighting instrument for the low light beam is disposed near the incident part; and
the second lighting instrument for the high light beam is disposed onto the second reflective surface.

7. The lamp apparatus of claim 1, wherein the reflector includes:
a connection guide formed to extend in a straight line and having a light passing space therein;
a first beam guide having both ends at which the incident part and a first bent part are formed, connected to communicate with the connection guide through the first bent part, disposed to extend in a direction different from a direction of the connection guide, and having the first reflective surface with the first reflection angle; and
a second beam guide having both ends at which a second bent part and the exit part are formed, connected to communicate with the connection guide through the second bent part, disposed to extend in a direction different from the direction of the connection guide, and having the second reflective surface with a second reflection angle.

8. The lamp apparatus of claim 7, wherein the second reflection angles of the second reflective surface is equal to or greater than a critical angle such that the light for the low light beam, which is incident through the incident part, is reflected on the first reflective surface and the second reflective surface to travel toward the exit part.

9. The lamp apparatus of claim 7, wherein a portion of the first reflective surface of the first beam guide is recessed to form a cut-off shaped part configured to form a cut-off line.

10. The lamp apparatus of claim 7, wherein the reflector further includes a light blocking shield configured to block light emitted from the connection guide and the first beam guide such that only light through the second beam guide is allowed to be emitted.

11. The lamp apparatus of claim 1, wherein the reflector includes:
a low beam guide formed to extend in a straight line and having the incident part formed therein;
an integrated guide formed to extend in a direction different from a direction of the low beam guide and having the exit part formed therein; and
a reflective guide configured to connect the low beam guide to the integrated guide and having the first reflective surface with the first reflection angle so as to reflect the light for the low light beam, which is incident through the incident part, toward the exit part.

12. The lamp apparatus of claim 11, wherein a cut-off shield configured to form a cut-off line is provided between the first lighting instrument for the low light beam and the incident part of the low beam guide, or in the incident part.

13. The lamp apparatus of claim 1, wherein:
the reflector is configured to branch out from the incident part into a plurality of parts to extend to different positions such that the reflector is formed to have a plurality of exit parts at different positions and a plurality of reflective surfaces are formed at corresponding bent portions;
the first lighting instrument for the low light beam is disposed near the incident part; and
a plurality of second lighting instruments for the high light beam are respectively provided onto corresponding reflective surfaces.

14. The lamp apparatus of claim 13, wherein the reflector includes:
a common guide formed to extend in a straight line, having both ends at which the incident part and a reflective part are formed, and having a third reflective surface formed at the reflective part and configured to reflect the light for the low light beam in a plurality of paths; and
an exit guide branching into the plurality of parts along the plurality of paths of the low light beams, which is reflected on the third reflective surface to travel in the common guide, bent in different directions to extend through bent parts, having fourth reflective surfaces which are formed at the bent parts and on which the light for the high light beam, which is irradiated from the plurality of second lighting instrument for the high light beam, is incident, and having exit parts at extending final ends.

15. The lamp apparatus of claim 13, wherein:

the plurality of second lighting instruments are configured to irradiate different colors of light for the high light beam; and the reflector further includes a complementary color shield configured to convert a color of light which is emitted to an area except for the exit parts.

* * * * *